G. EKLUND.
CHILD'S VELOCIPEDE.
APPLICATION FILED AUG. 18, 1919.

1,332,819.

Patented Mar. 2, 1920.

INVENTOR
G. EKLUND

ATT'Y.

UNITED STATES PATENT OFFICE.

GEORG EKLUND, OF EMERYVILLE, CALIFORNIA.

CHILD'S VELOCIPEDE.

1,332,819.        Specification of Letters Patent.     Patented Mar. 2, 1920.

Application filed August 18, 1919. Serial No. 318,183.

*To all whom it may concern:*

Be it known that I, GEORG EKLUND, a citizen of the United States, residing at Emeryville, in the county of Alameda and State of California, have invented new and useful Improvements in Children's Velocipedes, of which the following is a specification.

The object of the present invention is to provide a child's velocipede which can be propelled by an oscillating movement of the hands of the child and of which the propulsive mechanism will be simple and compact and capable of transmitting a propulsive force to the vehicle with either a forward or backward movement of the hands of the rider.

Figure 1:
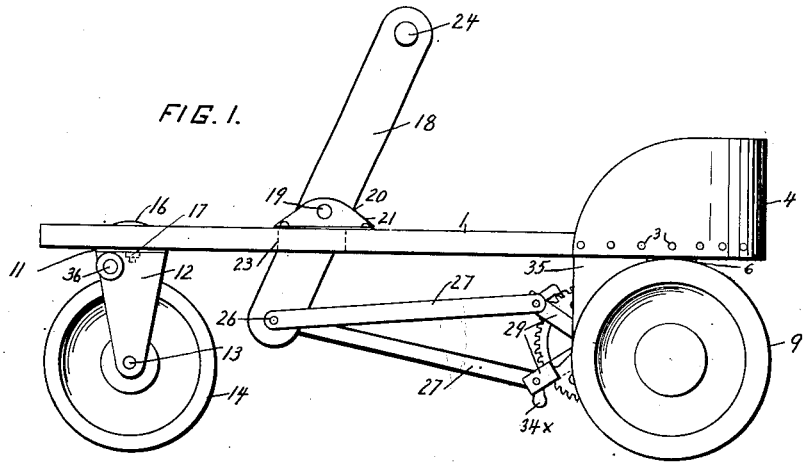
Figure 2:
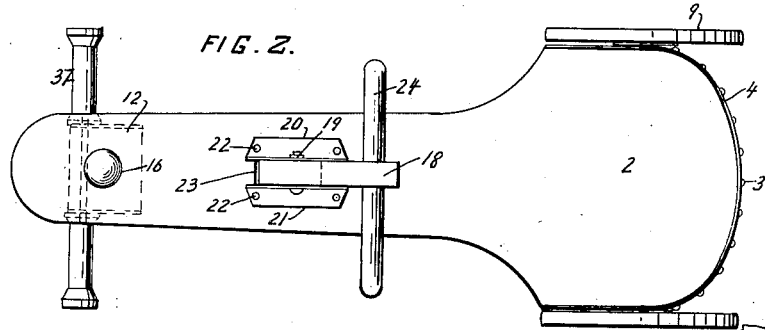
Figures 3, 4, 5, 6:
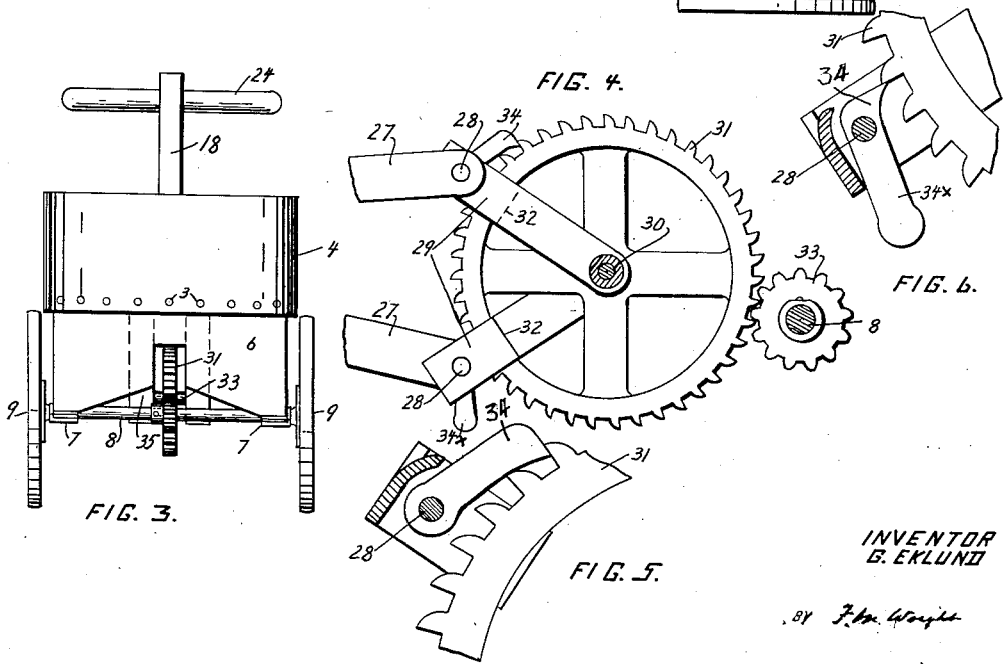

In the accompanying drawing, Figure 1 is a side view of the velocipede; Fig. 2 is a plan view thereof; Fig. 3 is a rear view; Fig. 4 is a detail side view of the part of the propulsive mechanism thereof; Figs. 5 and 6 are enlarged side views of details of said mechanism.

Referring to the drawing, 1 indicates the frame of my improved velocipede, enlarged at the rear end, as shown at 2, to form a seat for the rider, and having secured around said seat, as shown at 3, a raised guard 4. The rear portion of said frame is supported by a transverse block or bar 6, through the lower portion of which, at the ends, are secured bearings 7, in which rotates a shaft 8 fastened to the rear drive wheels 9. At its front end, there is secured to the under side of the frame a stationary plate 11, which rests upon the middle portion of a yoke 12, the sides of which are contracted to each other at their lower ends and carry a shaft 13 on which is mounted the front wheel 14. Said plate and yoke are connected to each other by a bolt 16 and a screw 17 on the lower end of said bolt.

The propulsive mechanism comprises a lever 18, pivoted, as shown at 19, between the two angle plates 20, 21, horizontal members of which are secured by screws 22 to the frame 1 on opposite sides of a hole 23 therethrough, said lever extending through said hole. Through the top of said lever extends a handle 24 and through the bottom end of said lever extends a bolt 26 to the ends of which are attached ends of pitmen 27, the other ends of which are pivoted, as shown at 28, to ends of radius rods 29, pivoted on a shaft 30 extending through longitudinal extensions from the block 6 on opposite sides of a gear wheel 31, loosely mounted on said shaft. The ends of the radius rods attached to the pitmen are each bent at right angles to the rod and then through a distance slightly greater than the thickness of the gear wheel 31 and then again at right angles back on themselves, as shown at 32, to a point slightly overlapping the gear wheel 31. The gear wheel 31 meshes with a pinion 33 secured upon the rear shaft 8. The pins 28 which connect the pitmen 27 with the radius rods 29 extend through the bent back portions 32 of the radius rods to form pivots for pawls 34 which engage the teeth of the gear wheel, said teeth being straight on one side and rounded on the other side to permit the pawls to slip over said teeth when returning in their inoperative movements.

It will be noted that one of the pawls oscillates over the upper portion of the gear wheel and that its operative movement is directed rearwardly, and the other pawl oscillates under the lower portion thereof and that its operative movement is directed forwardly and thus the gear wheel is continually propelled by the oscillating movement of the lever 18, and that neither of the pawls can arrive at a dead central position.

It will be also noted that each pawl is so weighted as to cause the tooth of the pawl to drop into position between the teeth of the gear wheel, the weight of the upper pawl being on that side of its pivot, which causes the tooth to drop into such position, and the lower pawl having an extension or tail 34× below the pivot of said pawl causing the upper or toothed portion to move into such position.

A rod 36 extends through the yoke above the front wheel and carries on each end extending outside the yoke a treadle 37.

I claim:—

1. In a child's velocipede, the combination of a frame, a lever extending through a hole in the frame, vibratable about a point adjacent to the frame, driving wheels, a gear wheel operatively connected through its gear teeth to said driving wheels to rotate the same, a shaft therefor, radius rods extending upwardly and downwardly from said shaft, on opposite sides of the gear wheel and bent, at points farther from said shaft than the radius of the gear wheel, in a direction parallel with said shaft and then bent back upon themselves so as to slightly overlap the gear wheel, pawls carried by a portion of said radius rods parallel with said shaft and adapted to engage said teeth of said gear wheel, and links connected with said radius rods and with the lower end of the lever, the weight of each pawl being so directed with reference to its pivot as to move the pointed end of the pawl between the teeth of the gear wheel.

2. In a child's velocipede, the combination of a frame, a lever extending through a hole in the frame, vibratable about a point adjacent to the frame, driving wheels, a gear wheel operatively connected through its gear teeth to said driving wheels to rotate the same, a shaft therefor, radius rods extending upwardly and downwardly from said shaft, on opposite sides of the gear wheel and bent, at points farther from said shaft than the radius of the gear wheel, in a direction parallel with said shaft and then bent back upon themselves so as to slightly overlap the gear wheel, on opposite sides of said gear wheel, pawls carried by a portion of said radius rods parallel with said shaft and adapted to engage said teeth of said gear wheel, and links connected with said radius rods and with the lower end of the lever, the weight of each pawl being so directed with reference to its pivot as to move the pointed end of the pawl between the teeth of the gear wheel.

3. In a child's velocipede, the combination of a frame, a lever extending through a hole in the frame, vibratable about a point adjacent to the frame, driving wheels, a gear wheel operatively connected through its gear teeth to said driving wheels to rotate the same, and having teeth flat on one side and rounded on the other, a shaft therefor, radius rods extending upwardly and downwardly from said shaft, on opposite sides of the gear wheel and bent, at points farther from said shaft than the radius of the gear wheel, in a direction parallel with said shaft and then bent back upon themselves so as to slightly overlap the gear wheel, pawls carried by a portion of said radius rods parallel with said shaft and extending in the same direction from the radius rods and adapted to engage the flat sides of the teeth of said gear wheel, and links connected with said radius rods and with the lower end of the lever, the weight of each pawl being so directed with reference to its pivot as to move the pointed end of the pawl between the teeth of the gear wheel.

GEO. EKLUND.